Oct. 6, 1953

L. S. TISDALE, SR
VARIABLE STROKE TRANSMISSION FOR
COOPERATING DRIVEN SHAFTS 2,654,259

Filed May 28, 1948

L. S. Tisdale Sr.
INVENTOR

BY C. A. Snow & Co.
ATTORNEYS.

Fig. 5.

L. S. Tisdale, Sr.
INVENTOR

Oct. 6, 1953

L. S. TISDALE, SR 2,654,259

VARIABLE STROKE TRANSMISSION FOR
COOPERATING DRIVEN SHAFTS

Filed May 28, 1948

L. S. Tisdale Sr.

INVENTOR

BY *C. A. Snow & Co.*

ATTORNEYS.

Patented Oct. 6, 1953

2,654,259

UNITED STATES PATENT OFFICE 2,654,259

VARIABLE STROKE TRANSMISSION FOR COOPERATING DRIVEN SHAFTS

Leo Singleton Tisdale, Sr., Meridian, Miss.

Application May 28, 1948, Serial No. 29,777

4 Claims. (Cl. 74—125.5)

This invention relates to a variable stroke transmission for cooperating driven shafts.

An object of the invention is to provide an improved variable stroke transmission for cooperating driven shafts more specially adapted to motor vehicles which will positively drive the motor vehicle, and will automatically apply a braking action to the rear pivoting wheel of the vehicle.

Another object of the invention is to provide an improved variable stroke transmission for cooperating driven shafts specially adapted for use with a motor vehicle for selectively driving the motor vehicle, and for applying and releasing a braking action upon the differential.

A further object of the invention is to provide an improved variable stroke transmission for cooperating driven shafts for motor vehicles which will be either automatically or manually operated.

A still further object of the invention is to provide an improved progressively operated variable stroke transmission for cooperating driven shafts for motor vehicles which will be highly efficient in operation, and relatively inexpensive to manufacture and produce.

Other objects will appear as the description proceeds.

In the accompanying drawings which form a part of this application.

Like characters of reference are used throughout the following specification and the accompanying drawings to designate corresponding parts.

In carrying out the invention, there is shown and provided an improved construction of variable stroke transmission for cooperating driven axles for motor vehicles including a substantially rectangular shape gear casing or housing generally designated by the reference numeral 1, and formed by a lower portion 2, an upper portion 3, and a removable cover 4. Gaskets 5 and 6, and bolts 7 and 8 are respectively employed for tightly securing the lower and upper portions, 2 and 3, together, and for securing the tab or cover 4 and the upper portion 3 of the casing or housing 1 in assembled position.

Figure 1:
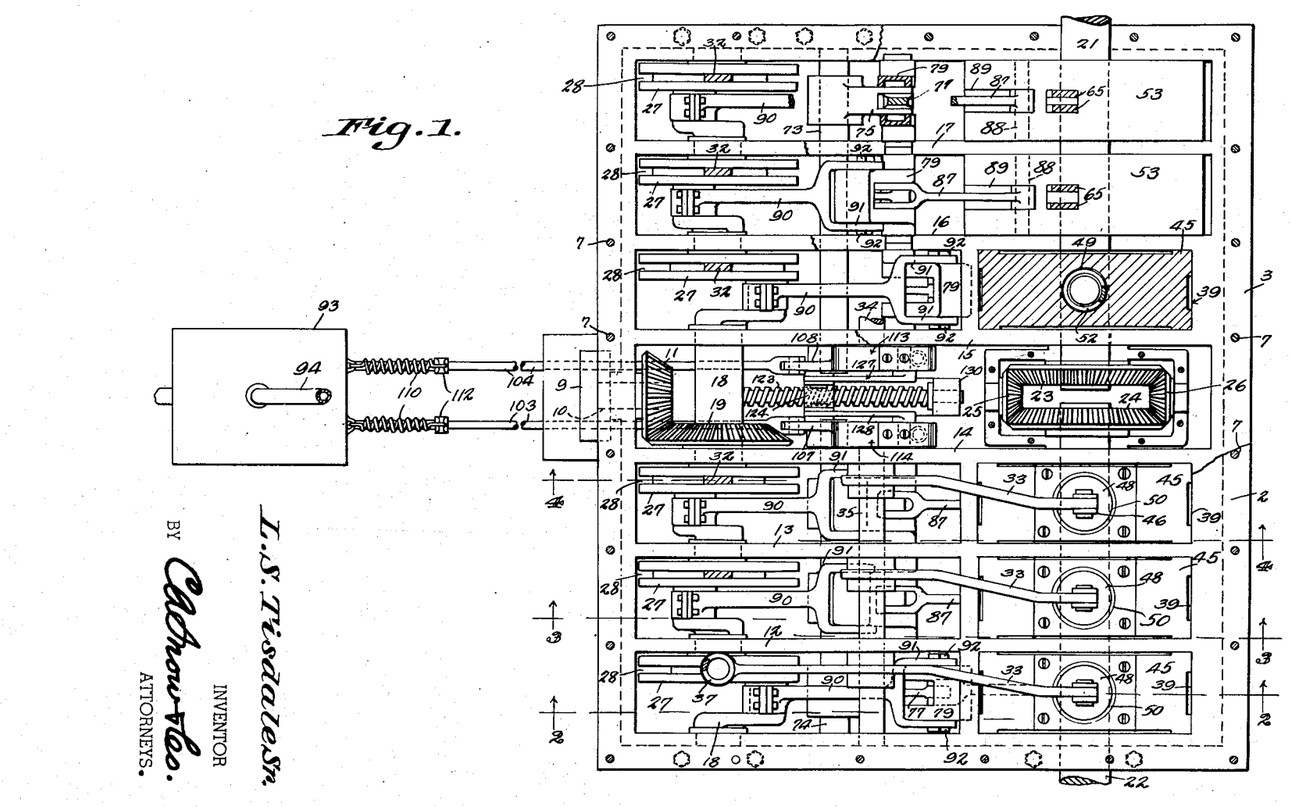
Figure 1 is a plan view of the improved variable stroke transmission for cooperating driven shafts with its housing or casing cover removed.

A driven power wheel 9 adapted to be connected with a suitable prime mover (not shown) is secured to the forward end of the power shaft 10 extending through the front wall of the gear casing or housing 1, and a bevel gear 11 is secured to the inner rear end of said shaft 10, as clearly shown in Fig. 1 of the drawings.

Six vertical longitudinally arranged parallel webs or partitions 12, 13, 14, 15, 16 and 17 are formed in spaced relation integrally within the gear casing or housing 1, and a crank shaft 18 is rotatably mounted transversely through said webs or partitions at the juncture of the lower portion 2 and upper portion 3 of the gear casing or housing 1. A bevel ring gear 19 is secured to the crank shaft 18 approximately midway of its length and meshes with the bevel driving pinion or gear 11 for operating and driving the crank shaft 18.

The gear casing or housing 1 will be filled with a lubricant (not shown), and arcuate apertures 20 will be cut through the several webs or partitions 12, 13, 14, 15, 16 and 17 in order that the lubricant may reach every part and portion in the casing or housing 1.

Transversely aligned rear axle sections 21 and 22 for the right and left hand rear vehicle wheels (not shown) are mounted between the lower and upper gear casing or housing portions 2 and 3 adjacent the rear of the gear casing or housing 1, and support the ring gears 23 and 24 on their respective inner ends connected by means of the pinion gears 25 and 26, thereby forming the differential.

Six cam wheels 27 are secured to the crank shaft 18, one cam wheel 27 being located in each compartment or space between the adjacent webs or partitions 12, 13, 14, 15, 16 and 17. The cam wheels 27 are formed with peripherally formed slots 28 and with oppositely disposed internal cam tracks 29 in which the rollers 30 are disposed. The rollers 30 are mounted on the cross pins 31 on the depending forward ends 32 of the six rocker arms 33, which are supported upon the two transversely aligned shaft sections 34 and 35 mounted through the webs or partitions 12, 13, 14, 15, 16 and 17 near the top of the gear casing or housing 1. The forward ends of the six rocker arms 33 are normally and resiliently urged downwardly, being formed with upstanding lugs 36 upon which the coil tensioning springs 37 are supported, the upper ends of the springs 37 seating in the seats or recesses 38 formed in the under surface of the cover 4 of the gear casing or housing 1.

Six transversely aligned vertically arranged substantially rectangular guide chambers or housings 39, are formed integrally within the upper portion of the rear end of the gear casing or housing 1, and each supports and guides a rectangular actuating block 45 therein for vertical reciprocal motion, the upper central portions of the blocks 45 being pivotally connected with the rear ends of the rocker arms 33 by means of the parallel links 46. The lower ends of the links 46 are connected by the pins 47 with the piston plugs 48 reciprocably mounted in the vertical bores 49 in the upper portion of the blocks 45, being held in place by the rings 50 and screw bolts 51. Coil springs 52 are disposed in the bottoms of the bores 49 below the piston plugs 48 and serve as cushioning means for the connections between the rocker arms 33 and blocks 45.

Disposed about the rear axle sections 21 and 22 are the hubs 53, the same being secured to said rear axle section by means of the keys 54, thus being rotatable as two units, three hubs 53 being fixed upon the axle section 21, and three hubs 53 being fixed upon the axle section 22.

Six cylindrical gripping clutch block supporting wheels 55 are mounted about the six hubs 53 for oscillatory movement, said wheels 55 being loose on the hubs 53 as they are rotated clockwise, and move with the hubs 53 when they are rotated counter-clockwise, being connected as units by the gripping action of the gripping clutch blocks 56 supported in each wheel 55.

The gripping clutch block operating means includes a radially extending bore 57 formed in the inner wall of each of the six cylindrical gripping clutch block supporting wheels 55, said bores 57 supporting the gripping clutch blocks 56 separated by the coil springs 58 and connected by means of the links 59 to the units 60. Screws 61 are extended through the units 60 and support the bevel gears 62 on their outer ends which mesh with the gear segments 63 mounted on the cross shafts 64. Yoke arms 65 are secured by pins 66 to the shafts 64 and are formed with laterally extending stub shafts 66 upon which the cam guide blocks 67 are mounted. The cam guide blocks 67 are disposed in the arcuate cam guide slots 68 in the blocks 45, whereby movement forwardly or counter-clockwise of the wheels 55 will be caused by the gripping clutch blocks 56 and as the blocks 45 are moved upwardly by the rocker 33 the gripping members will, through the lever 65, gears 62 and 63 and screw 61 force the blocks 56 into engagement with the wheels 55, and this forward or counter-clockwise movement of the wheels 55 will be produced.

It will be understood that the gripping clutch blocks 56 are disposed in different relative positions in the six wheels 55, being equally spaced apart about the full 360 degrees. Thus as the wheels 55 oscillate back and forth, one set of gripping clutch blocks 56 will be functioning at all times, that is if the steering column is turned and as one set of gripping clutch blocks 56 is gripping the preceding set will be released from gripping position.

Figures 16, 17, 18, 19, 20:
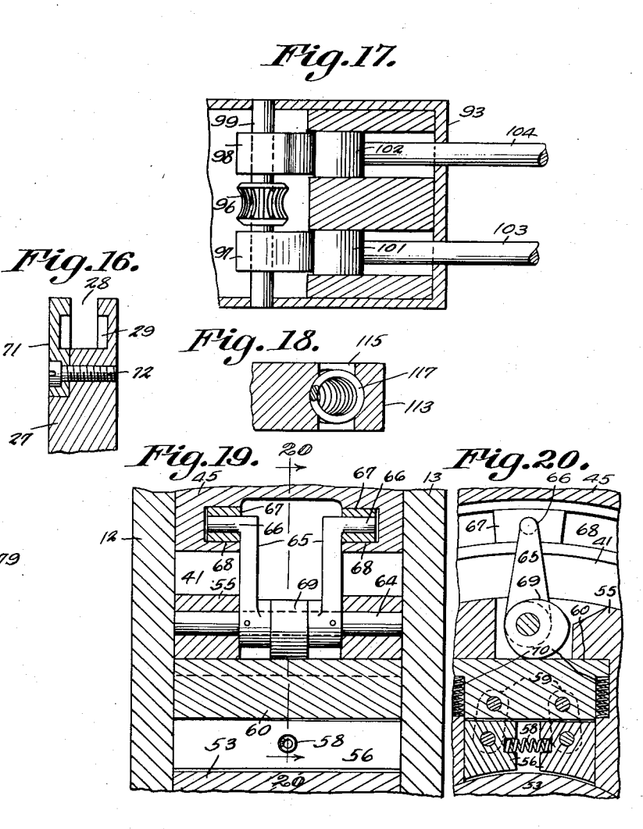
Fig. 16 is a detail sectional view taken on the line 16—16 of Fig. 2.
Fig. 17 is a detail sectional view taken on the line 17—17 of Fig. 7.
Fig. 18 is a detail sectional view taken on the line 18—18 of Fig. 7.
Fig. 19 is a detail sectional view of a modification of the gripping clutch blocks with cam and U-shape cam carrier for actuating the same.
Fig. 20 is a sectional view taken on the line 20—20 of Fig. 19.

In Figs. 19 and 20 of the drawings, a modified form of actuating means for the gripping clutch blocks 56 is shown, and substitutes a cam 69 supported upon the shaft 64 for the screw 59 and gear 62 and gear segment 63. In addition coil springs 70 are disposed between the wheels 55 and the units or members 60 for normally and resiliently holding the gripping clutch blocks 56 from the hubs 53.

In Fig. 16, there is shown a removable segment 71 held in position upon the side edge of the cam wheels 27 by means of the screws 72 and forms a part of the cam guide track 29, whereby the cross pins 31 and rollers 30 supported thereon may be positioned in or removed from the tracks 29.

A pair of transversely extending aligned shafts 73 and 74 are supported by the lower portion 2 of the gear casing or housing 1 and extend through the webs or partitions 12, 13, 14, 15, 16 and 17. Six crank arms 75 are keyed by the keys 76 to the shafts 73 and 74 and have their outer ends split to support the links 77 mounted upon the cross pins 78 disposed between the split portions or ends of the crank arms 75.

Figure 8:
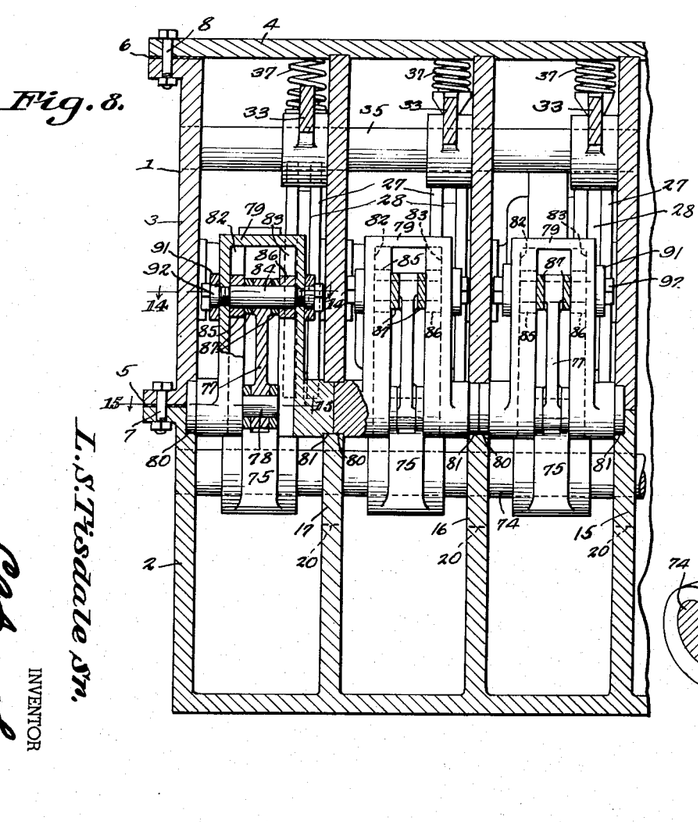
Fig. 8 is a sectional view taken on the line 8—8 of Fig. 3.
Figure 9:
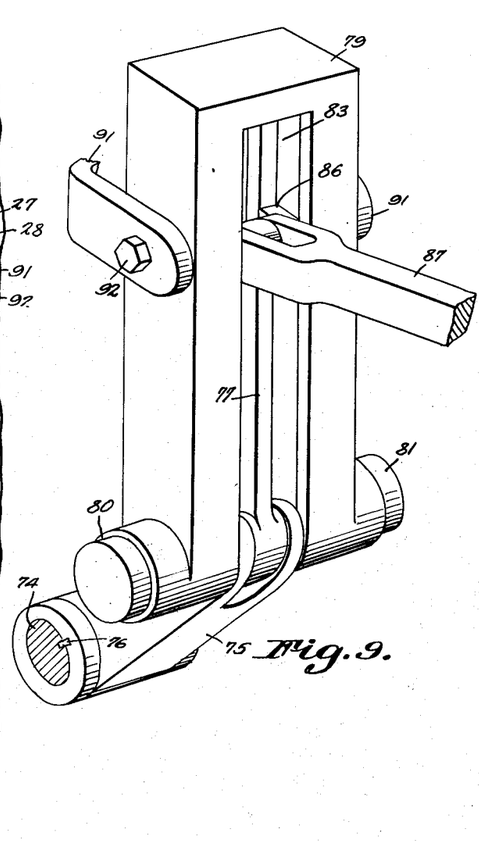
Fig. 9 is a perspective view of the hollow oscillator arm with linkage connected thereto.
Figures 10, 11, 12, 13:
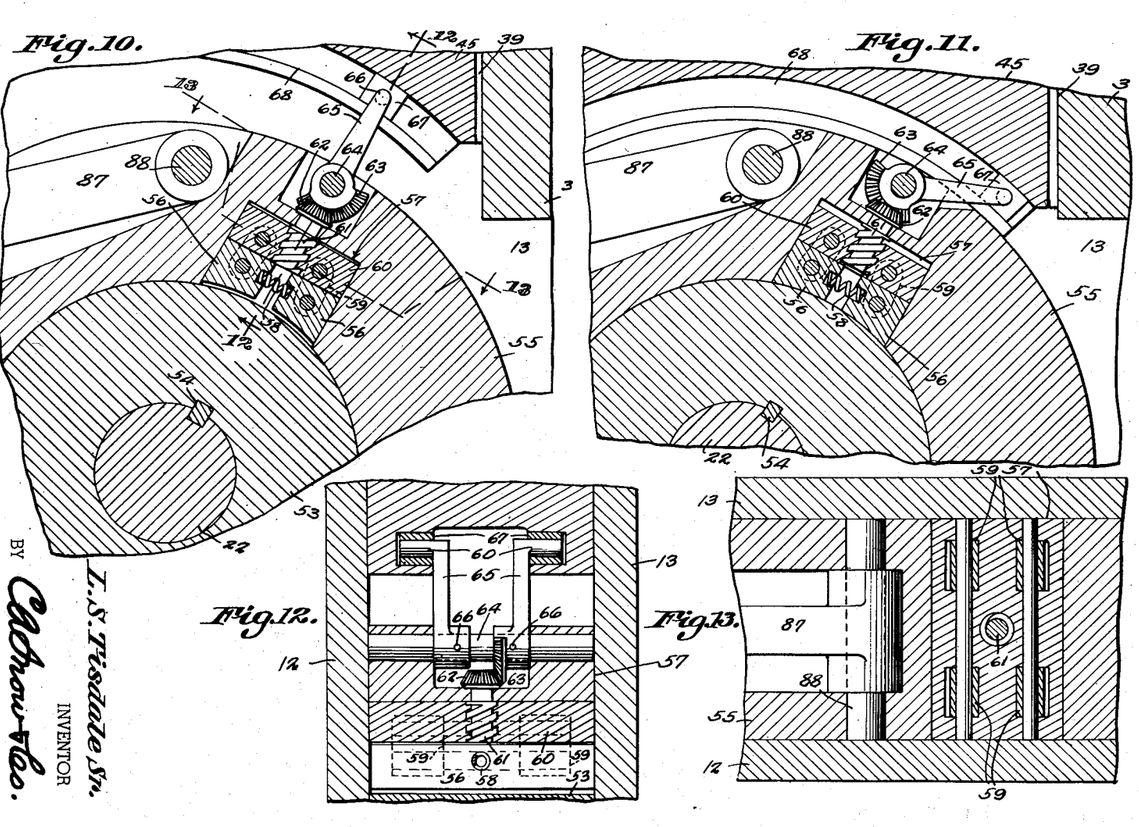
Fig. 10 is an enlarged detail sectional view through an axle section with hub keyed thereto, showing a carrier wheel with clutch blocks supported thereby in released position surrounding the hub and the operating mechanism for said clutch blocks.
Fig. 11 is a similar view to Fig. 10 but showing the clutch blocks in locked position upon the hub.
Fig. 12 is a detail sectional view taken on the line 12—12 of Fig. 10.
Fig. 13 is a detail sectional view taken on the line 13—13 of Fig. 10.
Figure 14:
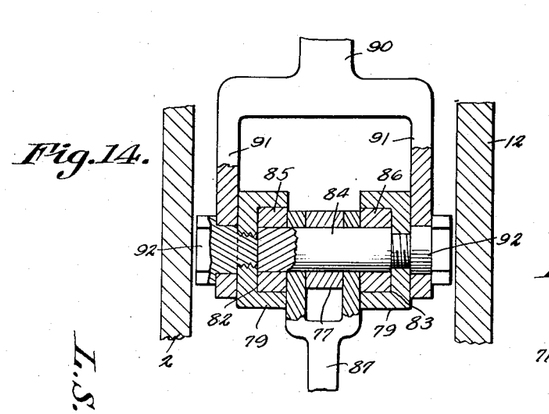
Fig. 14 is a detail sectional view taken on the line 14—14 of Fig. 8.
Figure 15:
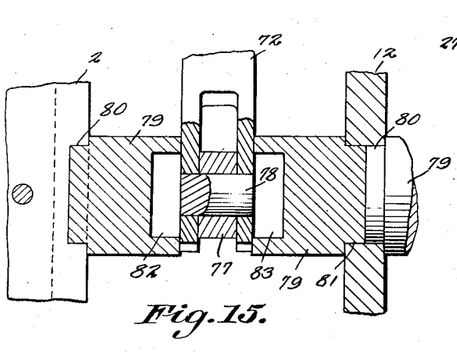
Fig. 15 is a detail sectional view taken on the line 15—15 of Fig. 8.

Six inverted U-shape oscillator arms 79 are journaled in the adjacent webs or partitions 12 to 17 inclusive at 80 and 81 and between the sides of the gear casing or housing 1, and each oscillator arm 79 is formed with the internal oppositely disposed guide channels 82 and 83 as shown by Figs. 8 and 9. The opposite ends of the links 77 from the ends supported by the pins 78, support the cross pins 84, which in turn support the guide blocks 85 and 86 slidably disposed in said guide channels 82 and 83 in the oscillator arms 79. The forked front ends of the connecting rods 87 are also pivotally connected to and supported by the cross pins 84. The rear ends of the connecting rods 87 are connected by the cross pins 88 to the wheels 55 and said rods 87 extending into the slots 89 formed in the peripheries of the wheels 55, whereby oscillatory rotary motion may be imparted to the wheels 55.

Six connecting rods 90 will be connected at their forward ends with the crank shaft, and will be formed with U-shape yoke rear ends 91 for pivotal attachment to the upper and opposite sides of the six oscillator arms 79, being pivotally supported by the bolts 92 extending through the U-shape yoke rear ends 91 and into the oscillator arms 79.

Figure 7:
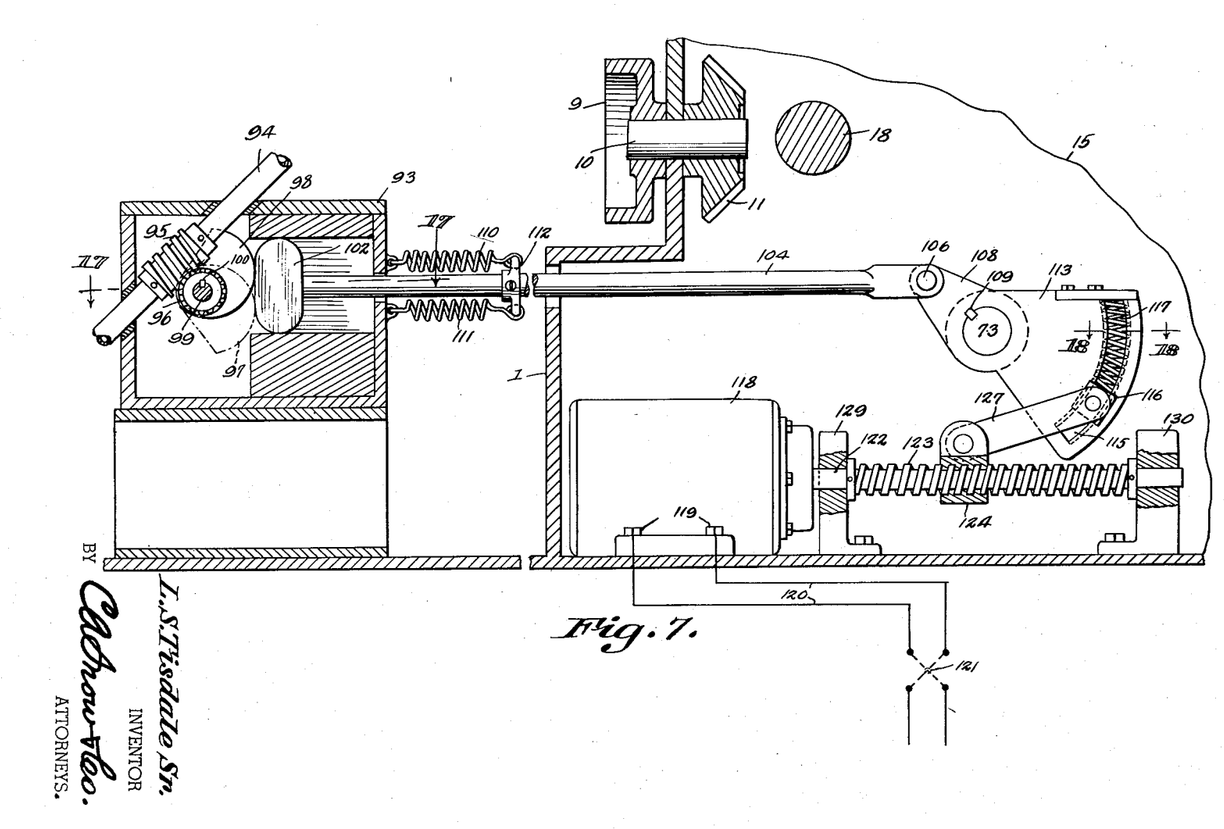
Fig. 7 is a sectional view taken on the line 7—7 of Fig. 6.

A steering column housing 93 is provided forwardly of the casing or housing 1, being supported on the same base therewith, and houses the steering column 94 about which the worm 95 is fixed, as shown by Fig. 7. The worm 95 meshes with the gear 96 which is disposed between the two cams 97 and 98, the same being fixed to the cross shaft 99 by means of the keys 100. The cams 97 and 98 are adapted to engage and push against the heads 101 and 102 on the forward ends of the actuating rods 103 and 104 when the steering column is rotated in steering the vehicle, the rear ends of which are pivotally connected at 105 and 106 with the arms 107 and 108 fixed to the shafts 74 and 73 by means of the keys 109.

Coil springs 110 and 111 are attached between the steering column housing 93 and brackets 112 on the rods 104 and 105 for normally and resiliently pulling the rods with their heads 101 and 102 into engagement with the cams 97 and 98.

A pair of segment members 113 and 114 are also fixed upon the shafts 73 and 74 being rockable upwardly and downwardly as the steering column 94 is turned to the right or left. Arcuate guide slots 115 are formed in the segment members 113 and 114 and support the guide blocks 116 which abut the coil springs 117 housed in the upper ends of the slots 115, serving to force the guide blocks 116 to their lowermost position in the slots 115.

A reversible electric motor 118 is secured by bolts 119 in the gear casing or housing 1 and is connected by the wiring 120 to a reversing switch 121 and from the switch to a source of electric current supply (not shown).

The outer end of the shaft 122 of the motor 118 is formed into a screw 123 and supports a nut 124, which in turn is formed with spaced ears 125 and 126, to which links 127 and 128 are connected. The rear ends of the links 127 and 128 are connected to the guide blocks 116, as clearly shown in Fig. 7. The screw 123 is mounted at its opposite ends in the bearing standards 129 and 130 attached to the bottom of the gear casing or housing 1.

From the foregoing description, it will be understood that the mode of operation of the improved variable stroke transmission for cooperating driven axles will be as follows: As before mentioned, it will be understood that the six gripping clutch blocks and their supporting wheels 55 are supported in approximately evenly spaced position about the six hubs 53 keyed to the rear shaft or axle sections 21 and 22. As power is applied from a prime mover (not shown) through the power wheel 9, the crank shaft 18 will be rotated and through the hereinbefore described connections, one set of gripping clutch shoes will clamp its hub to move or rotate the axle sections forwardly, and as one set of gripping clutch shoes is releasing its hold on its hub, another set of gripping clutch shoes will grip its hub to continue the rotation of the axle sections, and this sequence of operation will be continued as long as power is supplied to drive the mechanism.

Figure 2:
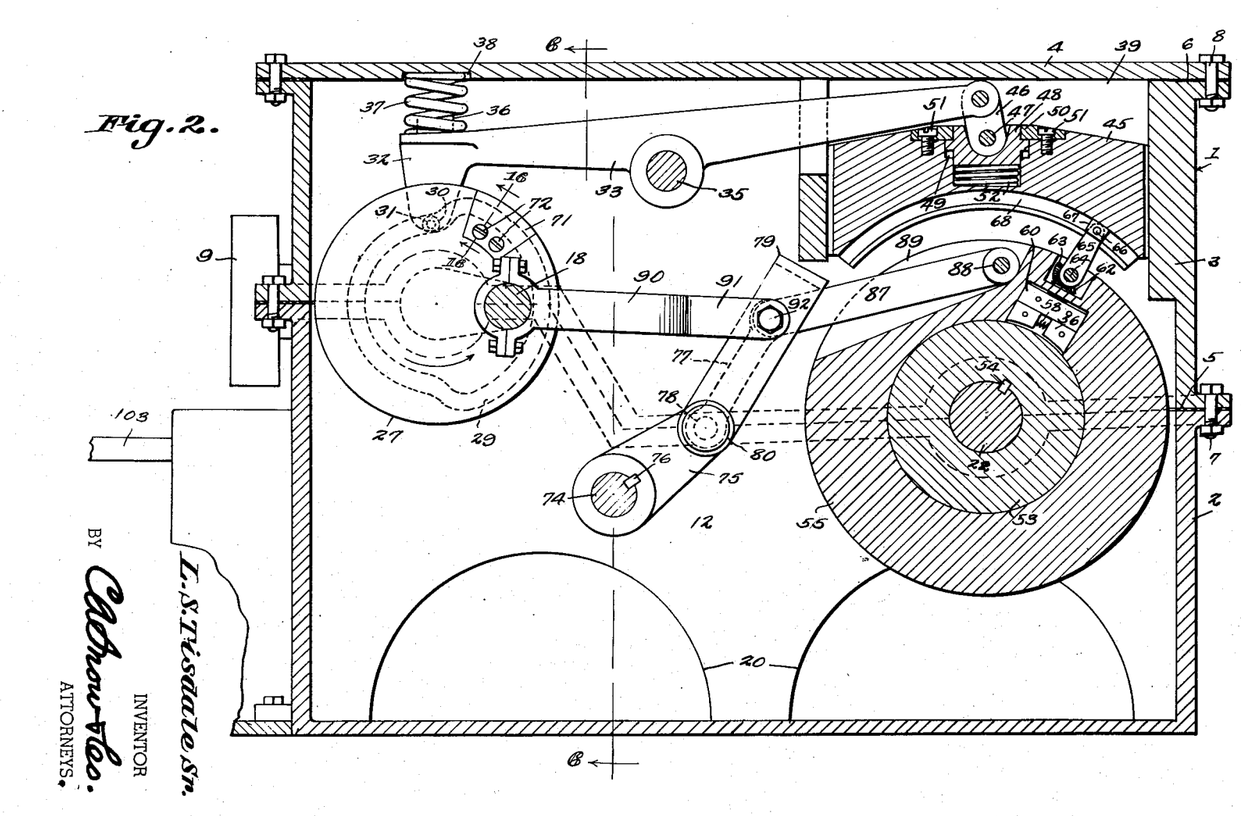
Fig. 2 is a sectional view taken on the line 2—2 of Fig. 1.
Figure 3:
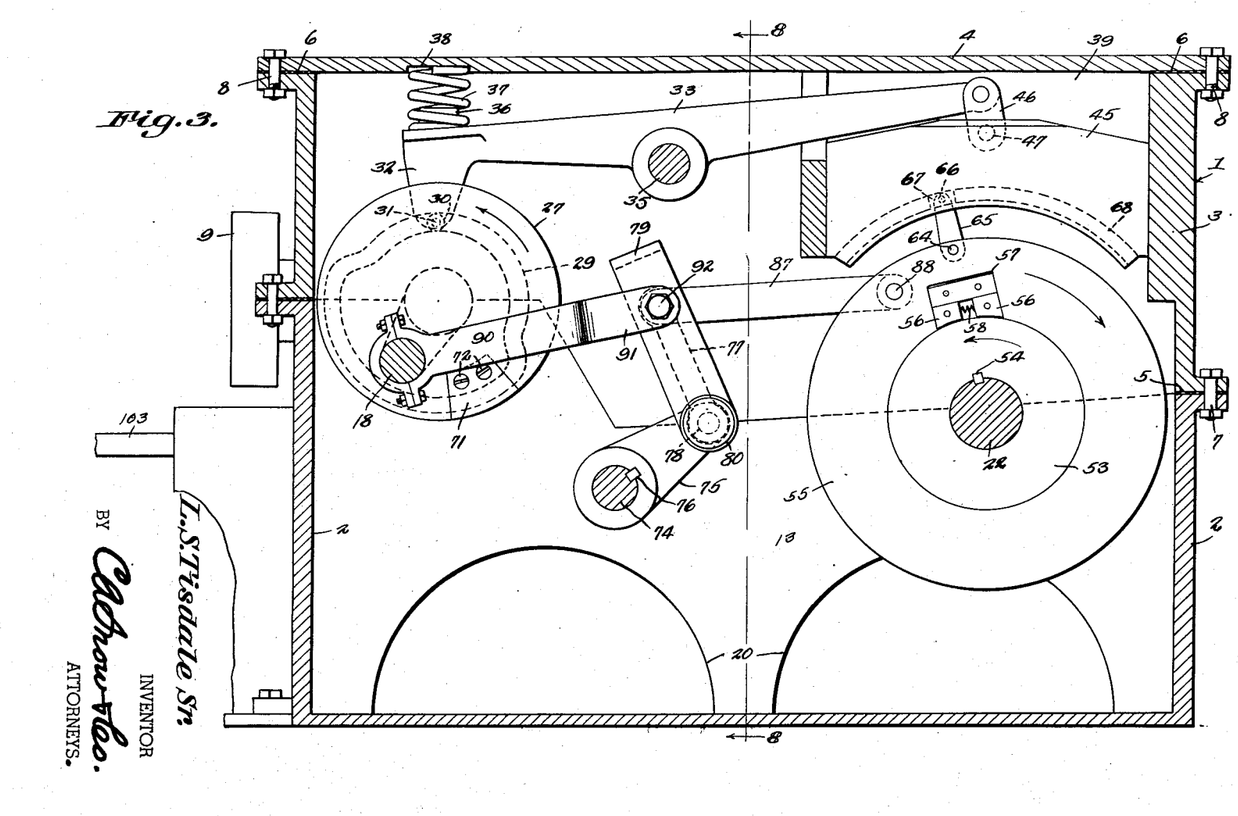
Fig. 3 is a sectional view taken on the line 3—3 of Fig. 1.
Figure 4:
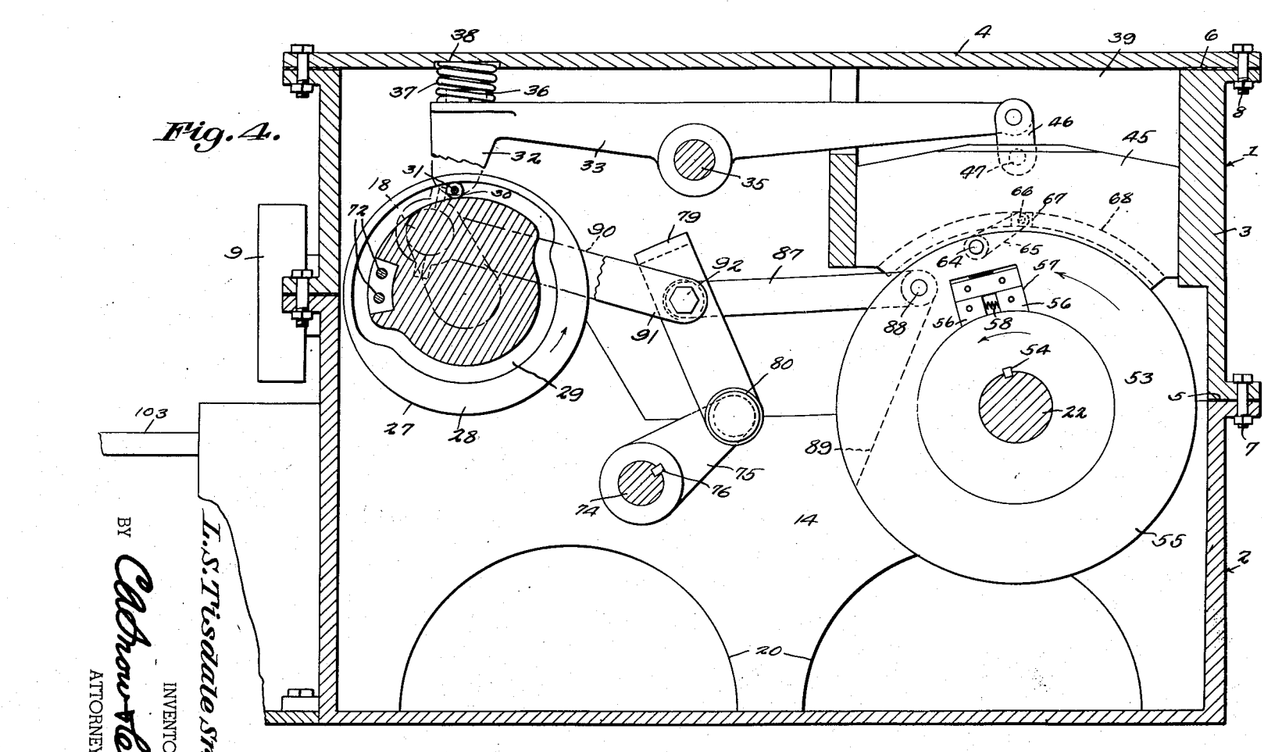
Fig. 4 is a sectional view taken on the line 4—4 of Fig. 1.

As the steering column 94 is rotated see Fig. 7, it will actuate either one or the other cams 97 or 98 which in turn operates through one or the other of the shafts 73 or 74 to lower the cranks 75 through the link 77 Fig. 2, whereby the pivot 84 is lowered in the yoke 79 and the stroke of the link 87 is reduced. This results in less movement of the rings 55 on that particular group of rings and ultimately a differential movement between the rear wheels in turning a corner.

Figure 5:
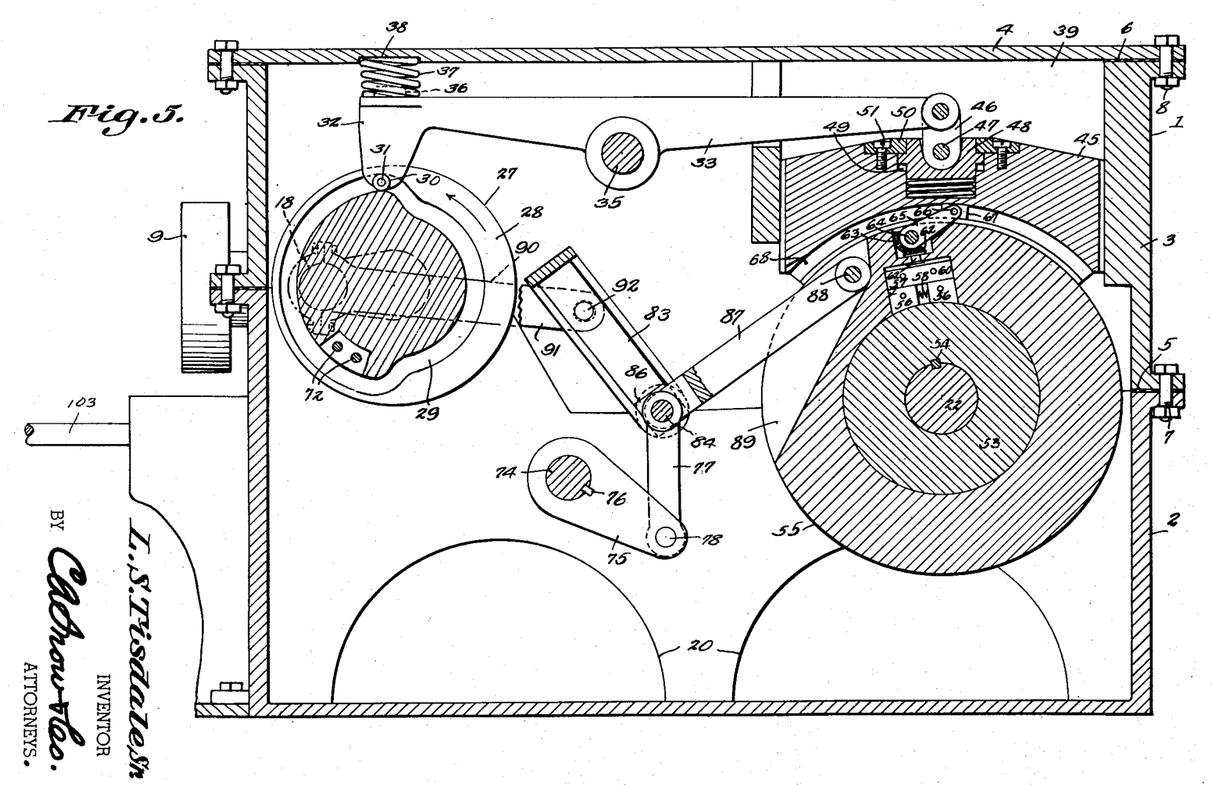
Fig. 5 is a similar sectional view to that shown in Fig. 4, but showing the various parts in neutral position.
Figure 6:
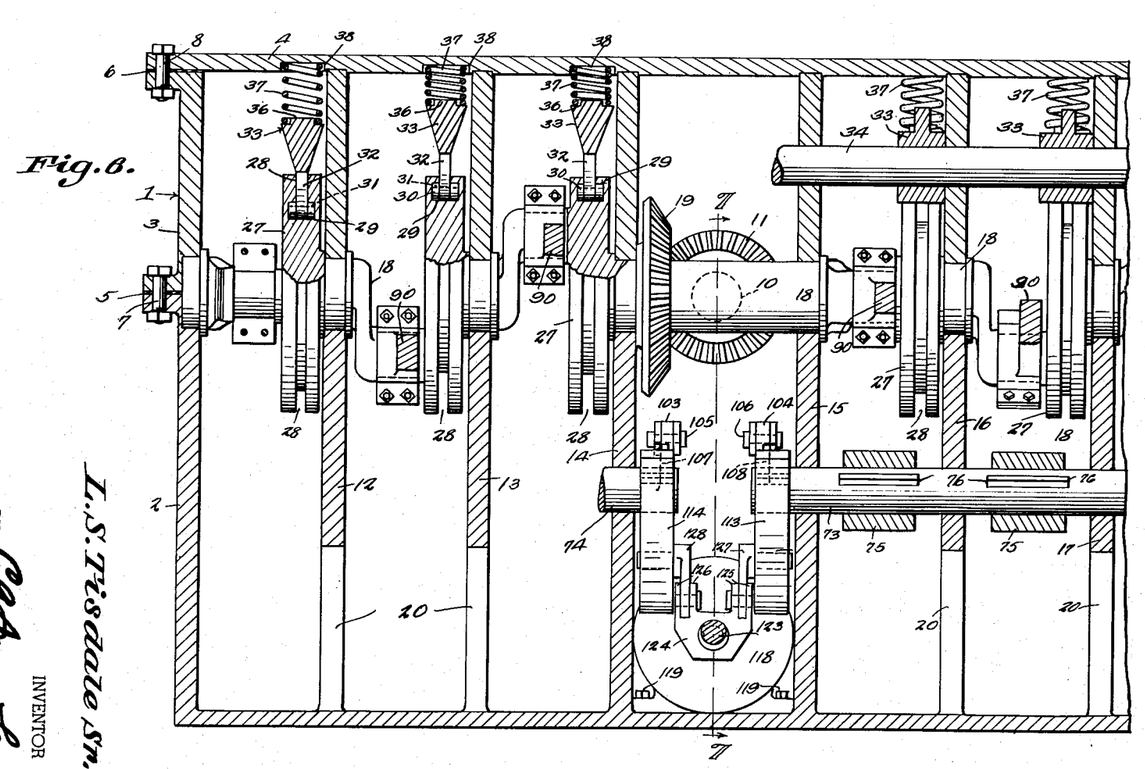
Fig. 6 is a sectional view taken on the line 6—6 of Fig. 2.

When it is desired to produce a braking action on the rear wheels the switch 121 is closed to operate the motor in one direction and through the units 124 and links 127 to oscillate the shafts 73 and 74 and cranks 75 to thus move the pin 84 to its lowermost point as shown by Fig. 5 where no oscillation of the link 87 will occur and one or more of the members 56 will be in gripping relation with the hub 53 and rotation of the axle sections 21 and 22 will be prevented. To release the brake it will be necessary to reverse the motor through the switch 121.

From the foregoing description, it will be apparent that there has been devised and provided a highly efficient form of clutch gear-differential for driving motor vehicles or other types of machinery.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. The combination with a variable stroke transmission for cooperating driven axles including aligned axle sections, and differential gearing between the adjacent ends thereof, of hubs keyed on said axle sections, wheels disposed about said hubs, clutch blocks in said wheels equally spaced concentrically about said axle sections, crank shaft operated cam wheels cam actuated members operatively connected to the cam wheels and clutch blocks for causing said clutch blocks to consecutively clutch said hubs to rotate the same and release as the next adjacent set of clutch blocks clutch the next adjacent hubs, pivotally mounted oscillating arms connected with the cam actuated members, and said axle clutch block supporting wheels, whereby oscillatory rotary motion is imparted to said gripping clutch block supporting wheels, and manually controlled means adapted to selectively affect the action of said clutch blocks on each axle section.

2. The subject matter as claimed in claim 1, vertically reciprocating members linked to said clutch block supporting members, and rocker arms connected with said cam wheels and said vertically reciprocating members.

3. The subject matter as claimed in claim 1, vertically reciprocating members linked to said clutch block supporting members, rocker arms connected between said cam wheels and said vertically reciprocating members, and spring tensioning means for said rocker arms.

4. The subject matter as claimed in claim 1, vertically reciprocating members linked to said clutch block supporting members, rocker arms connected between said cam wheels and said vertically reciprocating members, and clutch block actuating means in said wheels between the hub and said vertically reciprocating members.

LEO SINGLETON TISDALE, Sr.

References Cited in the file of this patent

UNITED STATES PATENTS

| Number | Name | Date |
|---|---|---|
| 1,055,677 | Sparks | Mar. 11, 1913 |
| 1,271,207 | Nickum | July 2, 1918 |
| 1,483,959 | Welch | Feb. 19, 1924 |
| 1,749,879 | Goddard | Mar. 11, 1930 |
| 2,192,016 | Petitjean | Feb. 27, 1940 |
| 2,502,859 | Laxo | Apr. 4, 1950 |

FOREIGN PATENTS

| Number | Country | Date |
|---|---|---|
| 609,396 | France | Aug. 13, 1926 |
| 643,433 | Germany | Apr. 8, 1937 |